Figure 1:
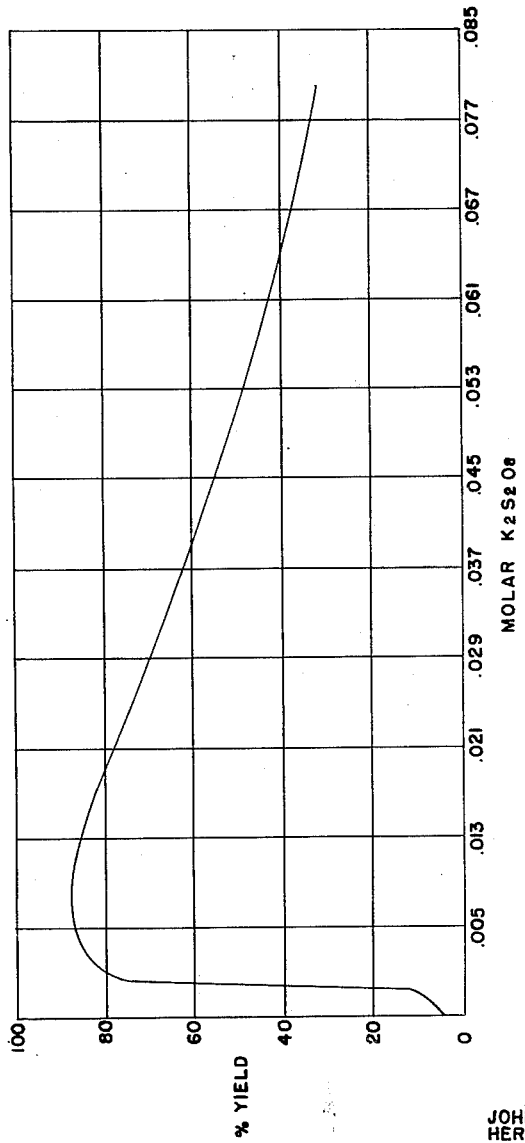

Patented Sept. 14, 1954

2,689,241

UNITED STATES PATENT OFFICE 2,689,241

POLYMERIZATION OF FLUORINE-CONTAINING MONOMERS IN AQUEOUS REDOX SYSTEM

Albert L. Dittman, Jersey City, and Herbert J. Passino, Englewood, N. J., and John M. Wrightson, Whittier, Calif., assignors to The M. W. Kellogg Company, Jersey City, N. J., a corporation of Delaware Application March 2, 1951, Serial No. 213,524

15 Claims. (Cl. 260—87.5)

This invention relates to the manufacture of fluorine-containing polymers. In one aspect this invention relates to the polymerization of halogenated olefins containing fluorine to produce polymers containing fluorine. In another aspect the invention relates to the polymerization of perhalo olefins in the presence of an aqueous suspension medium to produce a polymer. In still another aspect the invention relates to the polymerization of trifluorochloroethylene in the presence of an aqueous suspension medium to produce a normally solid polymer of high chemical and physical stability.

Various olefins containing fluorine may be polymerized under suitable conditions to produce polymers in the form of liquids, waxes and solids. Under suitable reaction conditions, trifluorochloroethylene, for example, polymerizes to produce a range of molecular weight polymers useful for various purposes. These polymers, produced from trifluorochloroethylene, are relatively inert chemically and have good physical properties in general. The oily polymer of trifluorochloroethylene may be used as a lubricant or insulating medium. The waxes of trifluorochloroethylene are also useful in making up lubricating compositions and for impregnating various materials to make them chemically resistant. The solid polymer of trifluorochloroethylene in its high molecular weight stage has the characteristics of a thermoplastic and is useful for a variety of purposes for which plastics may be used.

The present method of polymerizing trifluorochloroethylene is by a bomb type reaction at a relatively low temperature. The trifluorochloroethylene monomer is introduced into a bomb type reactor which is maintained at a temperature of about $-17°$ C. for a period of about seven days. The monomer is converted to a porous plug of solid polymer in the reaction vessel with approximately 30 per cent yield of polymer based on the monomer charged. The unreacted monomer is included in the interstices of the porous plug and may be removed therefrom by heating the plug in the reaction vessel under subatmospheric pressure so that the monomer is evaporated. After the monomer is evaporated, the plug is removed from the reaction vessel and broken into chips or granules for shipping, molding, etc.

The object of this invention is to provide a commercially feasible process for polymerizing halogenated olefins containing fluorine to produce a polymer in relatively high yields.

Another object of this invention is to provide a process in which a rapid and economical polymerization of perhalo olefins, such as trifluorochloroethylene, can be effected.

Another object of this invention is to provide an accelerator for increasing the yield and shortening the time of polymerization of halogenated olefins.

Various other objects and advantages of the present invention will become apparent to those skilled in the art from the accompanying description and disclosure.

As herein defined, polymerization refers to the polymerization of a single monomer and also to the copolymerization of unlike monomers to produce polymers.

According to this invention, a substituted ethylene containing at least two fluorine atoms, preferably at least one fluorine atom per carbon atom of the aliphatic portion of the substituted ethylene, is polymerized in the presence of an aqueous suspension medium under suitable conditions of temperature, pressure, residence time and promoting agent to produce a polymer, either liquid, wax or solid. The polymerization process of this invention may be effected in either a batchwise or continuous manner. The monomer is admixed with the aqueous suspension medium in a suitable polymerization zone which is maintained at the appropriate conditions of polymerization and under sufficient pressure to maintain the aqueous solution as a liquid under the conditions of polymerization. The monomer and water are agitated by suitable means in the reaction zone so as to intimately disperse the monomer and aqueous suspension medium. The monomer and polymer are substantially insoluble in the aqueous dispersion medium. The separation of the polymer from the water phase may be effected by settling and decantation, by filtering, by centrifuging, by evaporation; or by various other conventional methods, depending upon whether the polymer is in a liquid or solid state.

The present invention is particularly applicable to the polymerization of perfluorochloro olefins, such as trifluorochloroethylene. However, the invention contemplates the polymerization of various halogenated olefins. For example, perfluorobutadiene, perfluoropropene, phenyltrifluoroethylene, alpha methyl phenyl difluoroethylene, perfluoro acrylonitrile, perfluorostyrene, perfluorocyclobutene, perfluorocyclobutadiene, tetrafluoroethylene, vinylidene fluoride, trifluoroethylene and difluorodichloroethylene. As previously mentioned, the invention applies to the copolymerization of these monomers, as well as their homopolymerization. For example, the invention applies to the copolymerization of trifluorochloroethylene and tetrafluoroethylene, of trifluorochloroethylene and vinylidene fluoride, trifluorochloroethylene and vinyl fluoride, trifluorochloroethylene and vinyl chloride, trifluorochloroethylene and vinylidene chloride, trifluorochloroethylene and perfluoropropene, trifluorochloroethylene and trifluoroethylene, and of perfluorobutadiene and perfluorostyrene. In these copolymerizations, the second monomer is also preferably a fluorinated olefin and preferably containing at least two fluorine atoms per molecule. When less than 5 weight per cent comonomer is employed, the polymerization is broadly included within the term homopolymerization.

The quantity of water employed as the aqueous suspension medium is usually between about 0.05 to about 10 times by volume of the quantity of total monomer present in the reaction zone. Preferably, the quantity of water is between one and five times the total monomer in the reaction zone.

The temperatures employed for the polymerization will depend to a certain extent upon the particular monomers being polymerized. In general, the temperatures range between about 0° C. and about 250° C. in conjunction with a suitably high pressure to maintain the monomer and water in the liquid state. Pressures range from about 20 to about 1500 pounds per square inch gage, the lower pressures being used usually with the lower temperatures of polymerization. The higher temperatures are employed in the above range for the production of the liquid polymers, while the lower temperatures are usually employed for the production of solid polymers. For example, in the production of solid polymers of trifluorochloroethylene, temperatures between about 0° C. and about 30° C. or 40° C. are preferred, and for producing the liquid polymer of the same monomer, temperatures between about 75° C. and about 200° C. are preferred.

Similarly, the time of polymerization will depend upon the particular monomer being polymerized but, also, upon such factors as the composition of the monomer, molecular weight of the ultimate polymer, the temperature of polymerization and the type of promoter and activator being employed. In general, the polymerization time is between about 10 minutes and about 50 hours and usually between about 5 and about 35 hours The aqueous phase type of polymerization for the above monomers usually requires a suitable promoting agent for effecting the polymerization in a reasonable length of time and to produce a polymer of the desired molecular weight. These promoting agents fall in three general classes; promoters, activators and accelerators. In almost all instances, a promoter must be used. Such promoters comprise the inorganic peroxides. Examples of suitable inorganic peroxides are the water soluble peroxides, such as the perborates, persulfates, perphosphates, percarbonates, barium peroxide, zinc peroxide and hydrogen peroxide. Particularly valuable are the water soluble salts of the peracids, such as sodium, potassium, calcium, barium and ammonium salts of the persulfuric and perphosphoric acids which may be prepared in the conventional manner by electrolytic oxidation of salts of the corresponding oxy acids. Suitable concentrations of the promoter lie within the range of 0.003 molar to about 0.1 molar. The exact quanity of promoter will depend upon the monomer, molecular weight of the polymer desired and the particular promoter being employed. For example, in the polymerization of trifluorochloroethylene to produce the solid polymer thereof having a softening point above 200° C., a promoter concentration between about 0.003 and about 0.07 molar, or about 0.01 and about 2 per cent by weight based on water, is preferred. Somewhat higher concentrations are employed for producing the liquid polymer.

Promoters are also preferably used in conjunction with an activator. Such activators comprise sodium bisulfite, sodium hydrosulfite, sodium thiosulfate and trimethylamine, and in general any water soluble reducing agent. These activators are generally employed in concentrations similar to the concentration of promoter employed. Equal molar amounts of promoter and activator are preferred.

Buffering agents may be employed also to obtain the appropriate pH conditions. Acetic acid, propionic acid and monosodium phosphate may be employed in order to maintain a pH between about 1 and about 4.

In accordance with this invention, it has been found that the yield of polymer may be substantially increased and the time of polymerization may be substantially decreased by the use of accelerators, such accelerators being the ionizable inorganic water soluble salts of iron which element in its oxidized state is more readily reducible than the promoter and in its reduced state is more readily oxidizable than the activator. The accelerating element is introduced into the aqueous reaction mixture in the form of the water soluble salts, preferably as the low valence form of the accelerating element, and after introduction and dissolution therein the salts ionize. Various salts of the accelerating element comprise the hydroxides, carbonates, sulfates, phosphates, nitrates and chlorides. These salts of the accelerating element are admixed with the reaction mixture in an amount sufficient to maintain the concentration of the accelerating element or elements between about 1 and about 2000 p. p. m. based on water. For best results, the concentration of accelerating element or admixtures of accelerating elements is preferably maintained between about 5 and about 300 p. p. m. in the aqueous phase during the polymerization. In the polymerization of trifluorochloroethylene in a potassium persulfate-sodium bisulfite aqueous system, an iron sulfate is admixed with the reaction mixture in an amount sufficient to maintain the concentration of the accelerating element between about 10 and about 100 p. p. m. during the polymerization.

It is preferred to maintain the water phase substantially free from water soluble organic compounds, such as alcohols and ketones, since such compounds are inhibitors for the polymerization of trifluorochloroethylene and have a marked adverse effect on the polymerization reaction and on the characteristics of the product produced. The use of purified or distilled water is thus preferred.

In carrying out the process of this invention using an accelerator, the polymerization is effected in a vessel or conduit which is not capable of being attacked by the ingredients employed in the polymerization. Suitable corrosive resistant materials useful for construction or lining of the reaction vessel or conduit comprise stainless steel, Inconel, Monel, silver, nickel, glass or fluorinated solid polymers.

In all cases, the liquid in the reaction zone must be vigorously agitated to maintain the reactant and promoting agents in intimate contact. The vigorous agitation of the liquid phase of the reactor may be obtained by high speed stirring, such as with small propellers connected by means of a shaft to a high speed electric motor. Forced circulation of the liquid phase through orifices or small diameter conduits is also an effective method for achieving intimate mixing of the reactant, water and promoting agents. In general, any system suitable for obtaining a mechanical emulsion without using detergents will be applicable; in most instances detergents being harmful to the polymerization reaction.

It is within the scope of this invention to disperse finely-divided solids in the liquid phase as a suspension for the purpose of acting as fillers for the polymer product and for the purpose of forming nuclei for the start of the polymerization. The following are examples of such fillers: various pigments such as titanium dioxide, carbon black; clays; asbestos; glass fiber; and other relatively inert solids.

The following runs are offered as a better understanding of the present invention and indicate the appropriate conditions of polymerization and examples of promoters, activators and accelerators. The runs and conditions are not to be considered unnecessarily limiting to the present invention.

Figure 2:
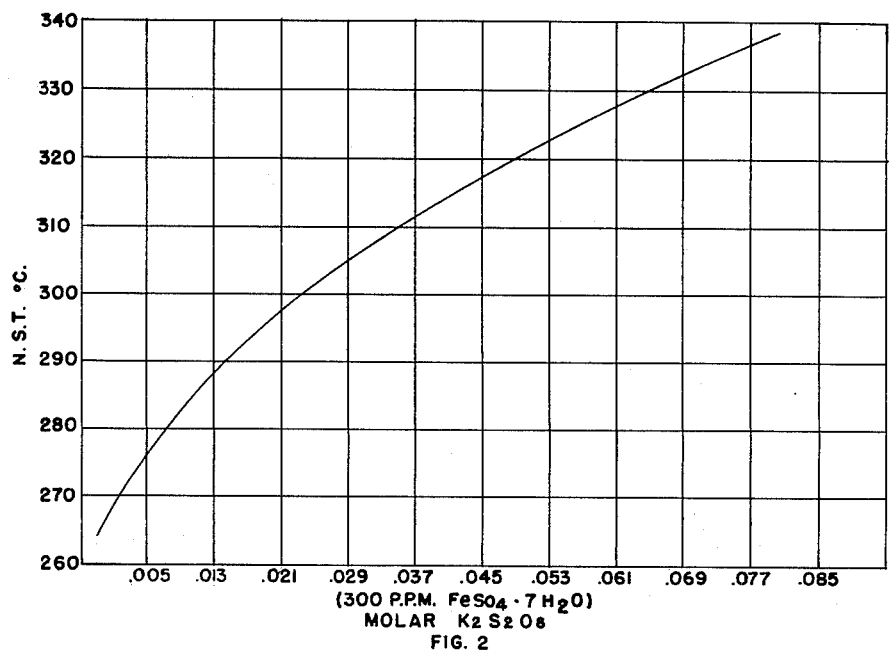

Table I illustrates typical runs in glass reaction tubes. The weight ratio of water to monomer in these runs was about 2.5:1 and equimolar concentrations of potassium persulfate and sodium bisulfite was employed unless otherwise noted to the contrary in the remarks column. Table II illustrates typical runs in stainless steel reaction bombs. All runs were made at 5° c. for 24 hours except as noted. Figure 1 of the drawing is a graph of per cent yield of solid polymer versus molar concentration of potassium persulfate employing an equimolar quantity of sodium bisulfite and 100 p. p. m. $FeSO_4 \cdot 7H_2O$. Figure 2 of the drawing is a graph of N. S. T. of the solid product of polymerization versus molar concentration of potassium persulfate employing an equimolar quantity of sodium bisulfite and 100 p. p. m. $FeSO_4 \cdot 7H_2O$.

Figure 3:
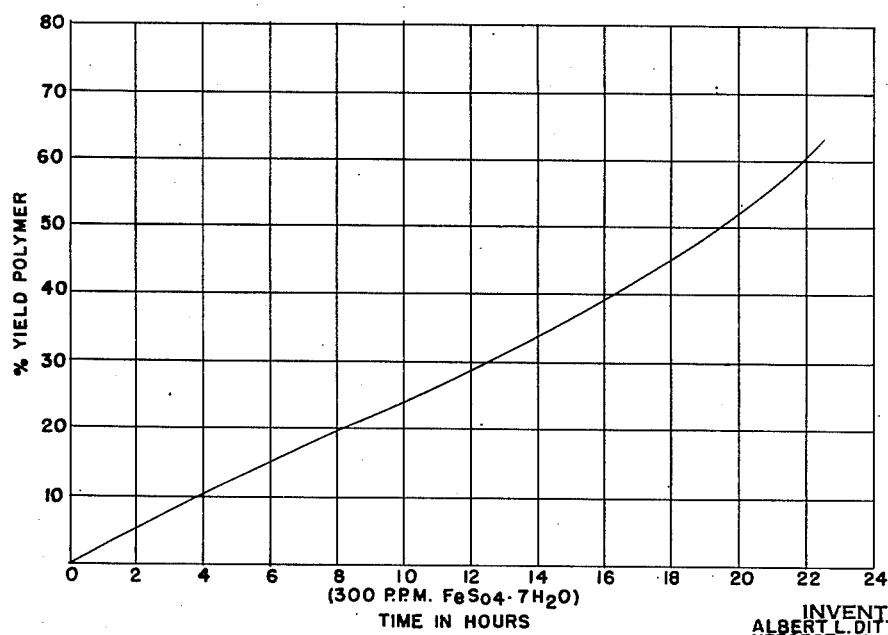

Figure 3 of the drawing is a graph of per cent yield of solid polymer versus reaction time in hours employing an equimolar quantity of sodium bisulfite and 300 p. p. m. $FeSO_4 \cdot 7H_2O$.

TABLE I

| Run No. | $K_2S_2O_8$ Molar Conc. | Temp., °C. | Time, hrs. | Percent Yield | Percent $K_2S_2O_8$ Remaining | N. S. T., °C. | pH | $FeSO_4 \cdot 7H_2O$, p. p. m. |
|---|---|---|---|---|---|---|---|---|
| 1 | 0.074 | 10 | 22 | 80.8 | 73.0 | 313 | 1.90 | 100. |
| 2 | 0.074 | 10 | 22 | 83.1 | 58.2 | 314 | 1.80 | 200. |
| 3 | 0.074 | 10 | 22 | 83.1 | 66.2 | 319 | 1.80 | 300. |
| 4 | 0.074 | 10 | 22 | 87.2 | 63.8 | 285 | 1.70 | 400. |
| 5 | 0.0185 | 10 | 22 | 84.0 | 80.1 | 302 | 2.00 | 25. |
| 6 | 0.0185 | 10 | 22 | 84.4 | 83.8 | 291 | 2.05 | 50. |
| 7 | 0.0185 | 10 | 22 | 87.8 | 81.1 | 284 | 1.90 | 75. |
| 8 | 0.0185 | 10 | 22 | 88.3 | 73.0 | 282 | 1.90 | 100. |
| 9 | 0.00037 | 5 | 20 | 5.7 | | | 2.75 | 100. |
| 10 | 0.00185 | 5 | 20 | 6.9 | | | | 100. |
| 11 | 0.0037 | 5 | 20 | 85.4 | | 271 | | 100. |
| 12 | 0.0074 | 5 | 20 | 88.0 | | 282 | | 100. |
| 13 | 0.0111 | 5 | 20 | 88.0 | | 293 | | 100. |
| 14 | 0.0148 | 5 | 20 | 87.9 | | 290 | | 100. |
| 15 | 0.0185 | 5 | 20 | 0.0 | | | | |
| 16 | 0.0185 | 5 | 20 | 49.0 | | 284 | | 5. |
| 17 | 0.074 | 5 | 2 | 5.8 | 74.4 | | 1.9 | 300. |
| 18 | 0.074 | 5 | 4 | 12.5 | 77.4 | | 1.88 | 300. |
| 19 | 0.074 | 5 | 6 | 13.5 | 70.3 | | 1.90 | 300. |
| 20 | 0.074 | 5 | 17 | 17.9 | 67.6 | | 1.80 | 300. |
| 21 | 0.074 | 5 | 17 | 41.7 | 73.0 | 328 | 1.82 | 300. |
| 22 | 0.074 | 5 | 21 | 55.4 | 75.7 | 328 | 1.82 | 300. |
| 23 | 0.074 | 5 | 24 | 71.9 | 73.0 | 332 | 1.80 | 300. |
| 24 | 0.074 | 5 | 7 | 26.8 | 73.0 | 322 | 1.80 | 300. |
| 25 | 0.037 | 5 | 24 | 83.4 | 75.6 | 305 | 1.80 | 300—0.037 Molar Conc. $Na_2S_2O_5$. |
| 26 | 0.056 | 5 | 24 | 61.8 | 82.2 | 324 | 1.88 | 300—0.056 Molar Conc. $Na_2S_2O_5$. |
| 27 | 0.074 | 5 | 24 | 18.9 | 86.5 | | 1.75 | 300—0.074 Molar Conc. $Na_2S_2O_5$. |
| 28 | 0.074 | 5 | 24 | 9.05 | 82.5 | | 1.70 | 300—0.111 Molar Conc. $Na_2S_2O_5$. |
| 29 | 0.074 | 5 | 24 | 24.8 | 89.2 | 330 | 1.90 | 300—0.037 Molar Conc. $Na_2S_2O_5$. |
| 30 | 0.074 | 5 | 24 | 66.3 | 90.6 | 321 | 1.92 | 300—0.0185 Molar Conc. $Na_2S_2O_5$. |
| 31 | 0.074 | 5 | 24 | 71.2 | 94.5 | 331 | 1.90 | 300—0.011 Molar Conc. $Na_2S_2O_5$. |
| 32 | 0.074 | 5 | 24 | 86.2 | | 344 | | 300—0.074 $Na_2S_2O_5$; 98 Mole percent; $CClF=CF_2$; 2 Mole percent $CH_2=CF_2$. |

TABLE II

*Stainless steel reaction bomb runs*

| Run No. | K₂S₂O₈ Molar Conc. | NaHSO₃ Molar Conc. | Percent Yield | Percent K₂S₂O₈ Remaining | NST, °C. | Remarks |
|---|---|---|---|---|---|---|
| 1 | 0.074 | 0.074 | 21.1 | 73 | 333 | 300 p. p. m. FeSO₄·7H₂O. |
| 2 | 0.074 | 0.074 | 8.6 | 94.5 | | 5 p. p. m. FeSO₄·7H₂O. |
| 3 | 0.074 | 0.074 | 20.8 | | | 300 p. p. m. FeSO₄·7H₂O. |
| 4 | 0.037 | 0.074 | 66.1 | 44.6 | 310 | All polymer was powder. 300 p. p. m. FeSO₄·7H₂O. |
| 5 | 0.037 | 0.074 | 52.5 | | | 300 p. p. m. FeSO₄·7H₂O. |
| 6 | 0.037 | 0.074 | 39.7 | | | Do. |
| 7 | 0.037 | 0.074 | 83.0 | | 310 | Polymer was part powder and part balls. 300 p. p. m. FeSO₄·7H₂O. |
| 8 | 0.0037 | 0.074 | 83.2 | | 313 | Do. |
| 9 | 0.0037 | 0.074 | 93.3 | | 325 | Do. |
| 10 | 0.074 | 0.074 | 15.7 | 81.2 | 314 | 300 p. p. m. FeSO₄·7H₂O. pH of reaction mixture 1.9. |
| 11 | 0.074 | 0.074 | 21.4 | 74.3 | 322 | 300 p. p. m. FeSO₄·7H₂O. pH of reaction mixture 1.82. |
| 12 | 0.0185 | 0.0185 | 8.7 | | 290 | iron, chromium and maganese ions present. 25° C.—66 hours. |
| 13 | 0.0185 | 0.037 (Thiosulfate) | 6.3 | | 290 | distilled water 25° C.—66 hours. |

Runs 1 to 11 made at 5° C. for 24 hours.

To further distinguish the solid polymer over the corresponding oils and waxes produced with the same monomer, the solid polymer is described by reference to its no strength temperature. A no strength temperature (N. S. T.) of between about 210° C. and about 350° C. is characteristic of a normally solid polymer of the above preparation having thermoplastic characteristics. Best plastic characteristics of the normally solid polymer are observed at N. S. T. values between about 240° and about 340° C. The N. S. T. value of the polymer depends upon the polymerization conditions, such as temperature, residence time, concentration and type of promoter agents, pressure, etc.

The no strength temperature (N. S. T.) is determined in the following manner: A thermoplastic sample of polytrifluorochloroethylene is hot pressed into a $\frac{1}{16}$″ thick sheet and cut into a strip of $\frac{1}{8}$″ x $\frac{1}{16}$″ x $1\frac{5}{8}$″. The strip is notched $\frac{5}{8}$″ from the top so that the dimension at the notch shall be $\frac{1}{16}$″ x $\frac{1}{16}$″. A fine wire and a standard weight is attached to one end of the strip. The weight of the polymer plus the wire and standard weight shall equal ½ grams. The strip is then attached in a furnace and fixed vertically therein. The temperature of the sample is increased at a rate of about 1½° C. per minute in the furnace as the breaking temperature is approached. The no strength temperature is the breaking temperature of the sample. Differences of about 5° C. are considered significant.

The present invention is directed to the use of accelerators in aqueous dispersion polymerization of substituted ethylenes containing fluorine. Although the invention has been primarily described by reference to the use of a particular accelerator or to the use of a single accelerator or accelerating element, it is within the scope of this invention to use various accelerators alone or in combination or admixture with each other. The invention is also preferably carried out in a system which is constructed or fabricated of noncorrosive materials to minimize or prevent the presence of additional ingredients which would render control of the concentration of accelerating element difficult. Furthermore, for best results the reactants, promoters and dispersing medium should be of high purity and substantially free from other elements or compounds. Thus the purification of the monomer in conventional manner and the use of distilled or pure water is highly desirable.

The present invention is a continuation-in-part of our prior and copending application Serial No. 61,082, filed November 19, 1948, which application discloses polymerizations of halogen-substituted olefins in aqueous systems.

Various modifications and alterations of the procedures of this invention may become apparent to those skilled in the art without departing from the scope of this invention.

Having described our invention, we claim:

1. A process for the production of polytrifluorochloroethylene which comprises polymerizing trifluorochloroethylene in a reaction zone in the presence of an aqueous suspension medium containing potassium persulfate as a promoter, sodium bisulfite as an activator and between about 10 and about 300 p. p. m. of a water soluble salt of iron calculated as iron as an accelerator under conditions to produce a polymer and maintaining the pH of the aqueous suspension medium between about 1 and about 4.

2. A process for the production of polytrifluorochloroethylene which comprises polymerizing trifluorochloroethylene in a reaction zone in the presence of an aqueous suspension medium containing between about 0.003 and about 0.1 molar concentration of potassium persulfate, between about 0.003 and about 0.1 molar concentration of sodium bisulfite and between about 10 and about 100 p. p. m. of iron sulfate calculated as iron under conditions to produce a polymer, the quantity of aqueous suspension medium being about 0.05 to about 10 times by volume of the quantity of monomer in the reaction zone and maintaining the pH of the aqueous suspension medium between about 1 and about 4.

3. A process for the production of a thermoplastic homopolymer of trifluorochloroethylene which comprises homopolymerizing trifluorochloroethylene in a reaction zone at a temperature between about 0° C. and about 40° C. for a period of time between about 5 and about 35 hours in the presence of an aqueous suspension medium containing between about 0.003 and about 0.07 molar concentration of potassium persulfate, between about 0.003 and about 0.07 molar concentration of sodium bisulfite and between about 10 and about 100 p. p. m. of iron sulfate calculated as iron such that a thermoplastic homopolymer of trifluorochloroethylene is produced, the quantity of water being between about 1 and about 5 times by volume the quantity of monmer in the reaction zone and maintaining th pH of the aqueous suspension medium between about 1 and about 4.

4. A process for the production of a polymer of trifluorochloroethylene which comprises polymerizing trifluorochloroethylene at a temperature between about 0° C. and about 10° C. in a reaction zone whose contact area consists of a substantially corrosion resistant material in the presence of purified water as an aqueous suspension medium, a water soluble inorganic peroxide as a promoter, a water soluble inorganic reducing agent as an activator and between about 5 and about 300 p. p. m. based on water of an ionizable accelerating element comprising a water soluble salt of iron calculated as iron such that a polymer is produced, and recovering the polymer thus produced maintaining the pH of the aqueous suspension medium between about 1 and about 4.

5. A process for the production of a polymer of trifluorochloroethylene which comprises polymerizing trifluorochloroethylene at a temperature between about 0° C. and about 40° C. in a reaction zone whose contact area consists of stainless steel in the presence of an aqueous suspension medium containing potassium persulfate as a promoter, sodium bisulfite as an activator and between about 10 and about 300 p. p. m. of iron sulfate calculated as iron for a period of time between about 5 and about 35 hours to produce a polymer and maintaining the pH of the aqueous suspension medium between about 1 and about 4.

6. A process for the production of a fluorine-containing polymer which comprises polymerizing a substituted ethylene having at least one fluorine atom per carbon atom of the aliphatic portion of the substituted ethylene in the presence of an aqueous suspension medium containing a water soluble inorganic peroxide as a promoter, a water soluble inorganic reducing agent as an activator and between about 10 and about 300 p. p. m. of an ionizable accelerating element comprising a water soluble salt of iron calculated as iron at a temperature between about 0° C. and about 250° C. under a sufficiently high pressure to maintain the aqueous suspension medium in a liquid state and maintaining the pH of the aqueous suspension medium between about 1 and about 4.

7. A process for the production of polytrifluorochloroethylene which comprises polymerizing trifluorochloroethylene in a reaction zone in the presence of an aqueous suspension medium containing between about 0.003 and about 0.1 molar concentration of hydrogen peroxide, sodium bisulfite and between about 10 and about 2000 p. p. m. of a water soluble salt of iron calculated as iron, the quantity of aqueous suspension medium being about 0.05 to about 10 times by volume of the quantity of monomer in the reaction zone and maintaining the pH of the aqueous suspension medium between about 1 and about 4.

8. A process for the production of a thermoplastic polymer of trifluorochloroethylene which comprises polymerizing trifluorochloroethylene in a reaction zone at a temperature between about 0° C. and about 40° C. in the presence of an aqueous suspension medium containing between about 0.003 and about 0.1 molar concentration of a thiosulfate as a promoter and sodium bisulfite as an activator and between about 10 and about 100 p. p. m. of iron sulfate calculated as iron such that a thermoplastic polymer of trifluorochloroethylene is produced, the quantity of water being between about 1 and about 5 times by volume the quantity of monomer in the reaction zone and maintaining the pH of the aqueous suspension medium between about 1 and about 4.

9. A process for the production of a polymer of trifluorochloroethylene which comprises polymerizing trifluorochloroethylene at a temperature between about 0° C. and about 250° C. in a reaction zone whose contact area consists of glass in the presence of an aqueous suspension medium containing a water soluble inorganic peroxide as a promoter, a water soluble inorganic reducing agent as an activator and an activating element comprising a water soluble salt of iron and maintaning the concentration of the accelerating element in the aqueous suspension medium between about 10 and about 300 p. p. m. calculated as iron and maintaining the pH of the aqueous suspension medium between about 1 and about 4.

10. A process for the production of a fluorine-containing polymer which comprises polymerizing a substituted ethylene having at least two fluorine atoms in the presence of an aqueous suspension medium containing a water soluble inorganic peroxide as a promoter, a water soluble reducing agent as an activator and between about 10 and about 2000 p. p. m. of an ionizable accelerating element comprising a water soluble salt of iron calculated as iron and maintaining the pH of the aqueous suspension medium between about 1 and about 4.

11. The process of claim 10 in which said substituted ethylene is perfluorobutadiene.

12. The process of claim 10 in which said substituted ethylene is trifluorochloroethylene.

13. The process of claim 10 in which said substituted ethylene is trifluorochloroethylene and is polymerized with vinylidene fluoride.

14. The proces of claim 10 in which said substituted ethylene is trifluorochloroethylene and is polymerized with trifluoroethylene.

15. The process of claim 10 in which said substituted ethylene is trifluorochloroethylene and is polymerized with vinyl chloride.

References Cited in the file of this patent

UNITED STATES PATENTS

| Number | Name | Date |
|---|---|---|
| 2,456,255 | Coffman et al. | Dec. 14, 1948 |
| 2,473,549 | Smith | June 21, 1949 |
| 2,569,524 | Hamilton | Oct. 2, 1951 |
| 2,600,202 | Caird | June 10, 1952 |
| 2,613,202 | Roedel | Oct. 7, 1952 |